US 12,276,363 B2

(12) United States Patent
Anderson

(10) Patent No.: US 12,276,363 B2
(45) Date of Patent: Apr. 15, 2025

(54) VERIFICATION DEVICE FOR A FLUID CONNECTION ASSEMBLY

(71) Applicant: Oetiker NY, Inc., Lancaster, NY (US)

(72) Inventor: Thomas A. Anderson, North Tonawanda, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/508,309

(22) Filed: Nov. 14, 2023

(65) Prior Publication Data

US 2024/0159339 A1 May 16, 2024

Related U.S. Application Data

(60) Provisional application No. 63/383,604, filed on Nov. 14, 2022.

(51) Int. Cl.
*F16L 37/133* (2006.01)

(52) U.S. Cl.
CPC ......... *F16L 37/133* (2013.01); *F16L 2201/10* (2013.01)

(58) Field of Classification Search
CPC ......... F16L 37/133; F16L 37/12; F16L 37/14; F16L 37/142; F16L 37/144; F16L 2201/10
See application file for complete search history.

(56) References Cited

U.S. PATENT DOCUMENTS

| | | |
|---|---|---|
| 10,690,277 B2 | 6/2020 | Fremont |
| 11,262,008 B2 | 3/2022 | Rydin et al. |
| 11,365,840 B2 | 6/2022 | Gauthier |
| 11,384,880 B2 | 7/2022 | Hunt et al. |
| 11,460,135 B2 * | 10/2022 | Wehrmann ............ F16L 37/144 |
| 2018/0266602 A1 | 9/2018 | Fremont |
| 2020/0309228 A1 | 10/2020 | Im |
| 2021/0364112 A1 | 11/2021 | Barthel et al. |
| 2021/0396336 A1 | 12/2021 | Schröter |
| 2022/0026002 A1 | 1/2022 | Gocha et al. |
| 2022/0074528 A1 | 3/2022 | Gocha et al. |
| 2022/0243850 A1 | 8/2022 | Teasley et al. |

FOREIGN PATENT DOCUMENTS

| | | |
|---|---|---|
| WO | 2021038162 A1 | 3/2021 |
| WO | 2022128266 A1 | 6/2022 |
| WO | 2022172176 A1 | 8/2022 |

* cited by examiner

*Primary Examiner* — Aaron M Dunwoody
(74) *Attorney, Agent, or Firm* — Harter Secrest & Emery LLP; Michael Nicholas Vranjes

(57) ABSTRACT

A verification assembly for a fluid connection assembly, including a retainer, including a first surface, a second surface, and at least one latch finger connected to and extending from the first surface, and a verification device, including a ring portion, at least one arm connected to and extending from the ring portion, and at least one indicator tab pivotably connected to the ring portion.

20 Claims, 7 Drawing Sheets

VERIFICATION DEVICE FOR A FLUID CONNECTION ASSEMBLY

CROSS-REFERENCE TO RELATED APPLICATIONS

This application claims the benefit under 35 U.S.C. § 119(e) of U.S. Provisional Application No. 63/383,604, filed Nov. 14, 2022, which application is incorporated herein by reference in its entirety.

FIELD

The present disclosure relates to fluid connectors, and more particularly, to a fluid connection assembly including a verification device that facilitates easy verification that the fluid connection assembly is fully connected.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Another example of fluid traveling between components is refrigeration lines, which may carry a refrigerant. A refrigerant is a substance or mixture, usually a fluid, used in a heat pump and refrigeration cycle, and can be hazardous. As such, it is essential that fluid connectors for refrigeration lines be properly secured so as not to allow the release of any refrigerant.

Fluid predominantly moves between components via flexible or rigid hoses which connect to each component by fluid connectors. Such fluid connectors typically may include a retaining mechanism that engages a shoulder on a tube when the tube is fully inserted into a connector body. However, it is possible that the tube be inserted into the connector body but not be secured by the retaining mechanism, which can result in fluid loss and possible failure of components.

Thus, there has been a long-felt need for a fluid connection assembly including a verification device that allows for easy verification of the connection status of a fluid connection assembly.

SUMMARY

According to aspects illustrated herein, there is provided a verification assembly for a fluid connection assembly, comprising a retainer, including a first surface, a second surface, and at least one latch finger connected to and extending from the first surface, and a verification device, including a ring portion, at least one arm connected to and extending from the ring portion, and at least one indicator tab pivotably connected to the ring portion.

In an exemplary embodiment, the verification device further comprises at least one tensioner operatively arranged to bias the verification device with respect to the retainer. In an exemplary embodiment, the at least one arm comprises a distal end comprising a flange, a proximal end connected to the ring portion, and a projection arranged between the distal end and the proximal end. In an exemplary embodiment, in a non-triggered state, the projection is engaged with the first surface. In an exemplary embodiment, the flange is engaged with the at least one latch finger. In an exemplary embodiment, in a non-triggered state, the at least one indicator tab is engaged with the retainer, and in a triggered state, the at least one indicator tab is not engaged with the retainer. In an exemplary embodiment, in a non-triggered state, the at least one indicator tab is engaged with an aperture arranged in the retainer. In an exemplary embodiment, the at least one indicator is biased toward a triggered position. In an exemplary embodiment, the verification device comprises at least one alignment pin operatively arranged to engage the retainer. In an exemplary embodiment, the at least one latch finger is operatively arranged to connect the verification assembly to the fluid connection assembly. In an exemplary embodiment, the indicator tab comprises a machine readable code. In an exemplary embodiment, the indicator tab comprises a radio-frequency identification tag.

According to aspects illustrated herein, there is provided a verification assembly for a fluid connection assembly, comprising a verification device, including a ring portion, at least one arm connected to and extending from the ring portion, at least one indicator tab pivotably connected to the ring portion, the indicator tab biased toward a triggered position, and a tensioner connected to the ring portion.

In an exemplary embodiment, the at least one arm extends from the ring portion in a first axial direction, and in the triggered position the indicator tab extends from the ring portion in a second axial direction, opposite the first axial direction. In an exemplary embodiment, the at least one arm comprises a distal end comprising a flange, a proximal end connected to the ring portion; and a projection arranged between the distal end and the proximal end. In an exemplary embodiment, the verification assembly further comprises at least one alignment pin extending in an axial direction from the ring portion. In an exemplary embodiment, the indicator tab comprises at least one of a machine readable code and a radio-frequency identification tag.

In an exemplary embodiment, the verification device further comprises a retainer including a first surface, a second surface, and at least one latch finger extending from the first surface, the at least one arm operatively arranged to engage the at least one latch finger. In an exemplary embodiment, the at least one indicator tab is engaged with the retainer in a non-triggered position, and not engaged with the retainer is the triggered position. In an exemplary embodiment, the tensioner is engaged with the second surface, the tensioner biasing the verification device in an axial direction with respect to the retainer.

According to aspects illustrated herein, there is provided a verification device. The verification device verifies a connection status of a fluid connection assembly by providing a visual and/or electronic signal. In an exemplary embodiment, the verification device is mountable on or in a locking assurance cap. In an exemplary embodiment, the verification device may contain digital information encoded thereon, for example a quick response (QR) code or radio frequency identification (RFID) code. In an exemplary embodiment, the verification device provides a quantitative way to record connection verification and quality assurance. In an exemplary embodiment, the verification device is a secondary verification device that is mountable on a locking assurance cap.

According to aspects illustrated herein, there is provided an apparatus including a locking assurance cap and a secondary verification device that provides a secondary verification of connection, for example, visual or digital verification. In an exemplary embodiment, the secondary verification device provides a quantitative way to document connection of a fluid connection assembly, for example, through a 2D bar code, a 3D bar code, or a RFID tag. In an exemplary embodiment, the secondary verification device comprises a displaceable flag including a code or chip, which is arranged in or on the flag. In an untriggered state, the flag may be bent inward and inserted into a cavity of the locking assurance cap. The flag may be connected to the secondary verification device via a living hinge or a traditional metal spring. In an exemplary embodiment, the secondary verification device may comprise one or more alignment pins, each pin is individually sized to fit into a space (e.g., the living hinge) of the locking assurance cap. The secondary verification device comprises one or more arms, with each arm including an end flange and a protrusion that sits in a circular recessed step at the base of the locking assurance cap fingers where they attach to the main body of the locking assurance cap. As the locking assurance cap is applied to the fluid connection assembly, the locking assurance cap fingers deflect radially outward causing the arms of the secondary verification device to displace radially outward. This causes the protrusion to disengage the circular recessed step, the secondary verification device to displace axially with respect to the locking assurance cap, and the flags to move from an untriggered state to the triggered state thereby exposing the code or chip for reading. In an exemplary embodiment, one or more springs are employed to facilitate the axial displacement of the secondary verification device with respect to the locking assurance cap.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
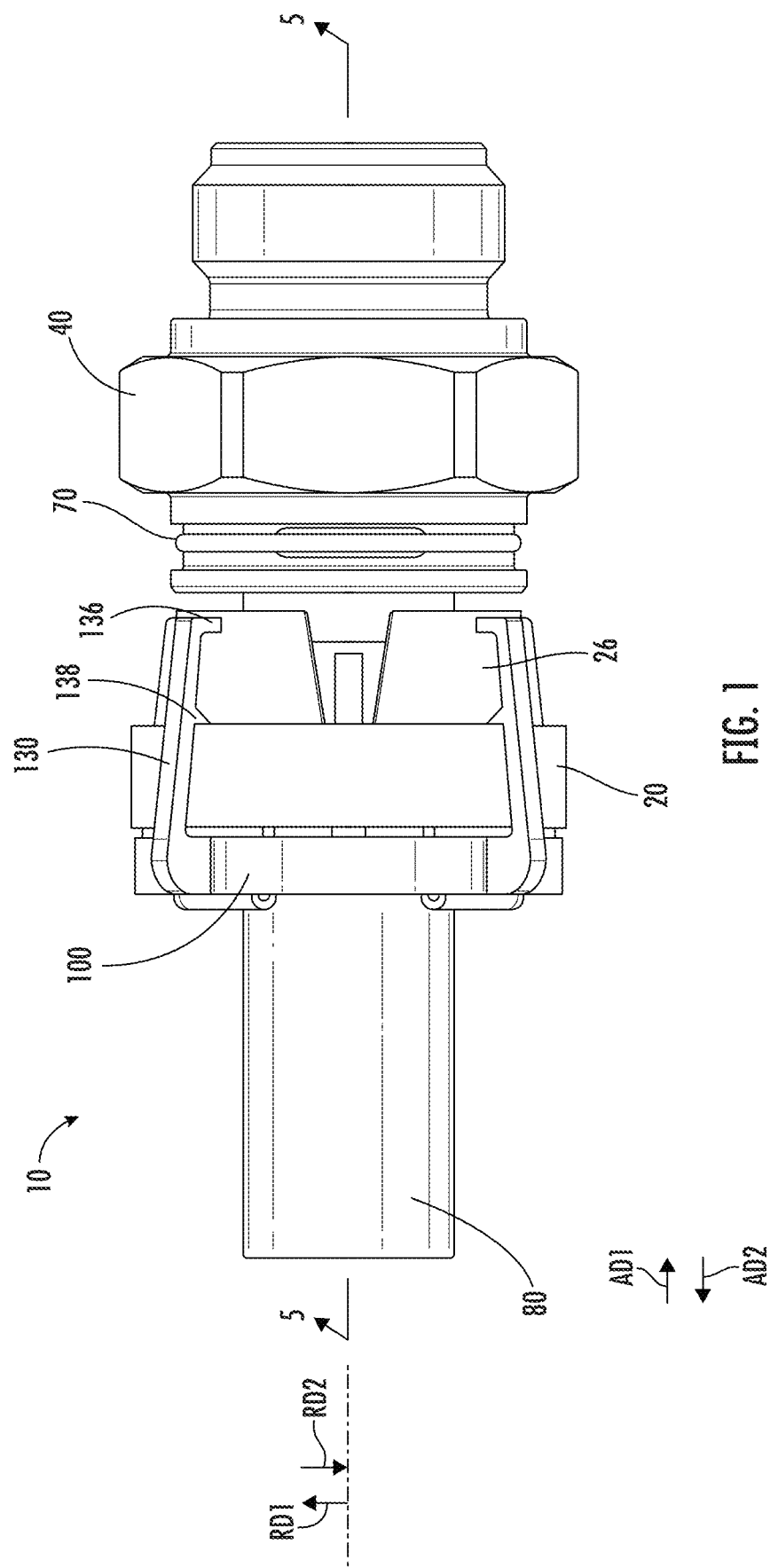
FIG. 1 is a side elevational view of a fluid connection assembly with a verification assembly in an untriggered state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials, and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
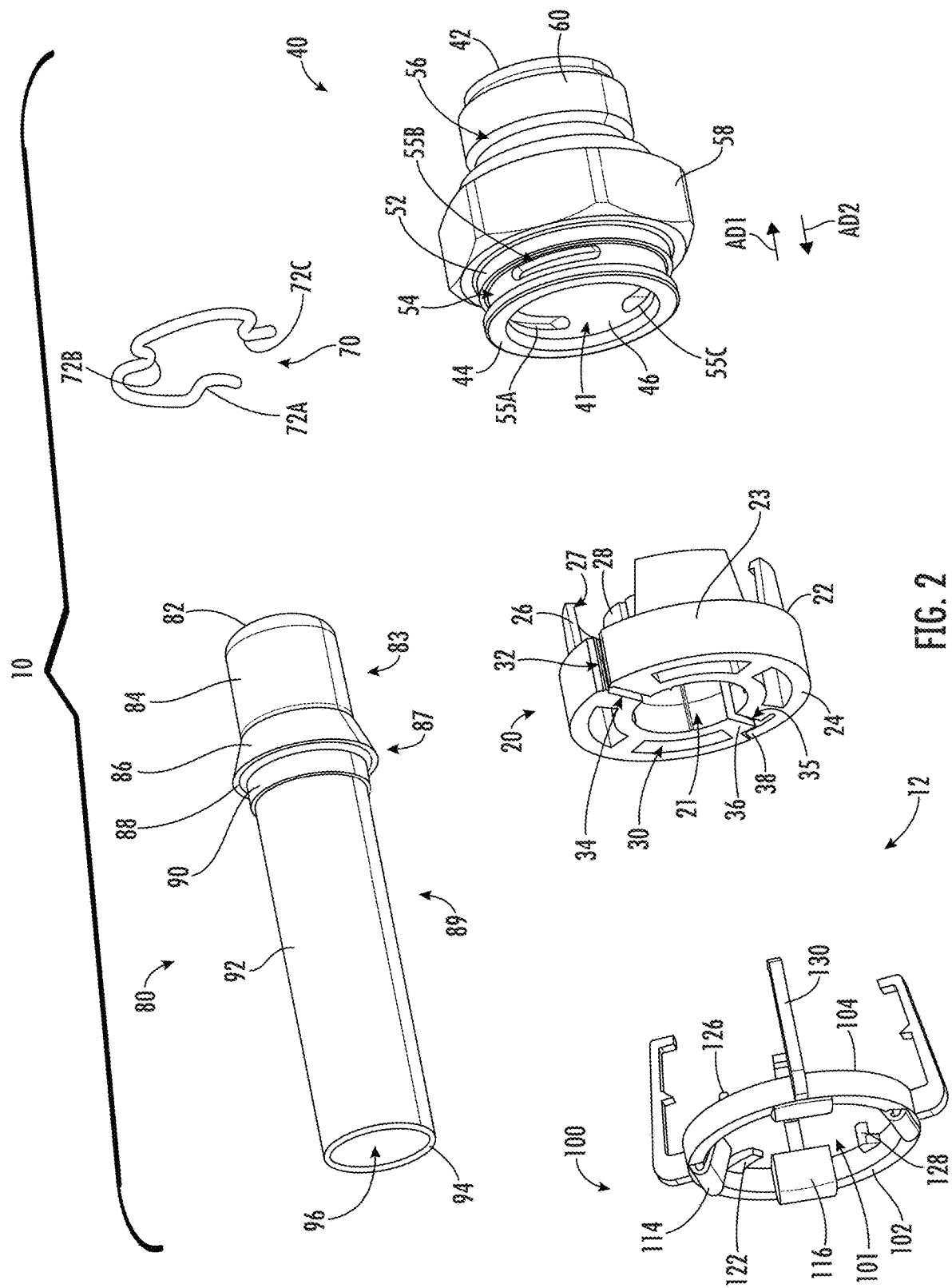
FIG. 2 is a front perspective exploded view of the fluid connection assembly shown in FIG. 1.

Adverting now to the figures, FIG. 1 is a side elevational view of fluid connection assembly 10 with verification assembly 12 in an untriggered state. FIG. 2 is a front perspective exploded view of fluid connection assembly 10. Fluid connection assembly 10 generally comprises connector body 40, retaining clip 70, and tube 80. In an exemplary embodiment, fluid connection assembly 10 further comprises assurance cap or secondary retainer or retainer 20. In an exemplary embodiment, fluid connection assembly 10 further comprises verification device 100. It should be appreciated that, as referred to herein, verification assembly 12 comprises secondary retainer 20 and verification device 100.

Tube 80 comprises end 82, section 83, shoulder 87, section 89, end 94, and through-bore 96. Through-bore 96 extends through tube 80 from end 82 to end 94. Section 83 is arranged between end 82 and shoulder 87 and comprises radially outward facing surface 84. Radially outward facing surface 84 includes a substantially constant diameter. In an exemplary embodiment, radially outward facing surface 84 comprises a frusto-conical or curvilinear taper proximate end 82 (see FIG. 5). In an exemplary embodiment, section 83 further comprises a raised section arranged between radially outward facing surface 84 and shoulder 87. Shoulder 87 is arranged between section 83 and section 89 and comprises radially outward facing surface 86 and surface 88. As shown, radially outward facing surface 86 is a frusto-conical surface extending from radially outward surface 84 to surface 88. Radially outward facing surface 86 increases in diameter is axial direction AD2. In an exemplary embodiment, radially outward facing surface 86 is an axial surface facing at least partially in axial direction AD1. In an exemplary embodiment, tube 80 comprises a constant diameter radially outward facing surface arranged between radially outward facing surface 86 and surface 88. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. In an exemplary embodiment, section 89 further comprises a raised section, namely, radially outward facing surface 90, arranged between shoulder surface 88 and radially outward facing surface 92. Radially outward facing surface 90 has a diameter that is greater than the diameter of radially outward facing surface 92.

Figure 5:
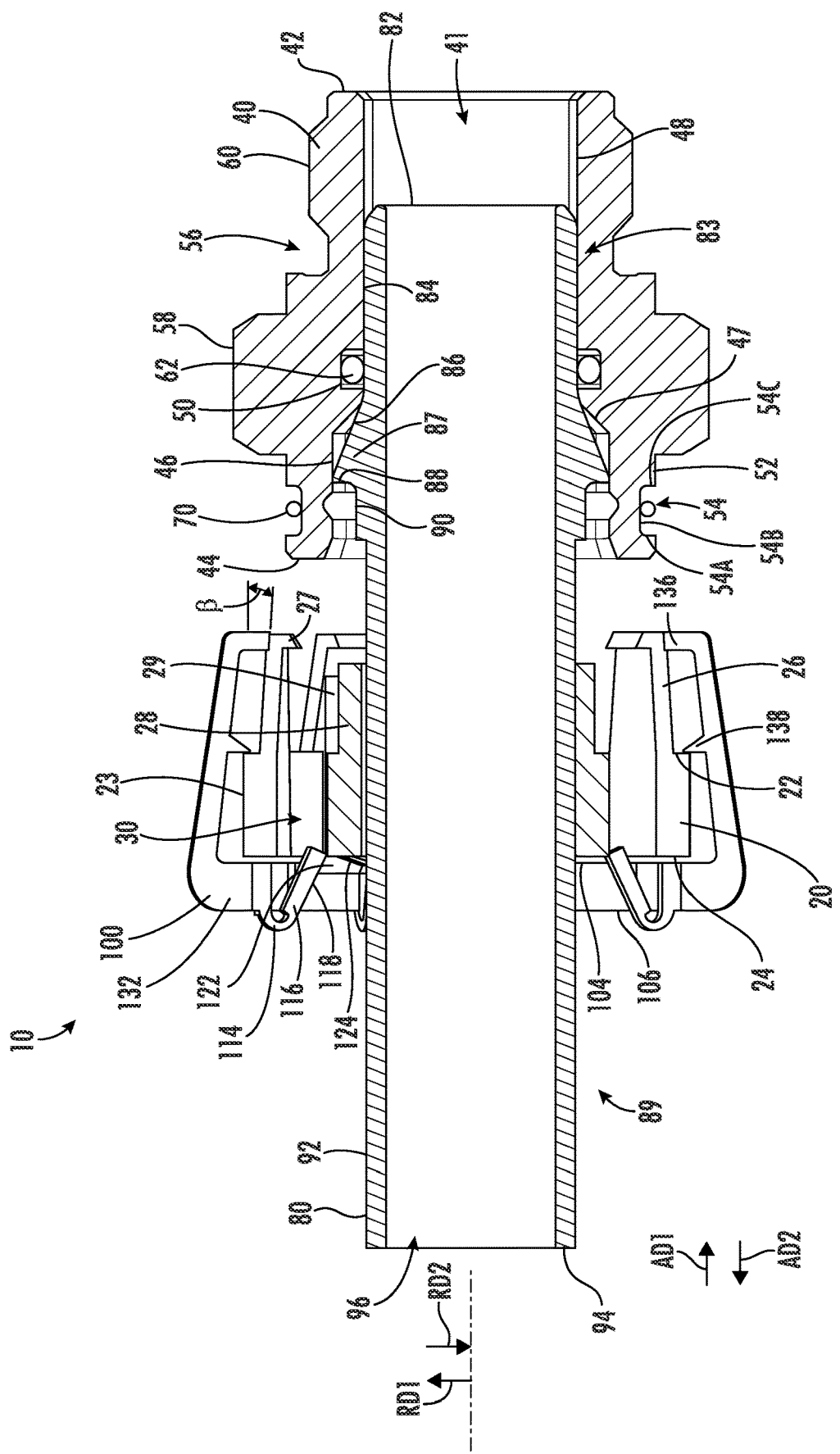
FIG. 5 is a cross-sectional view of the fluid connection assembly taken generally along line 5-5 in FIG. 1.

Tube 80 is arranged to be inserted, specifically with end 82 first, into connector body 40, specifically through-bore 41. Tube 80 is inserted into connector body 40 until section 83, or radially outward facing surface 84, engages seal 62 (see FIG. 5), and shoulder 87 axially clears retaining clip 70 (i.e., shoulder 87 is arranged on the right side of retaining clip 70 as shown in FIG. 5). It is the engagement of protrusions 72A-C with shoulder surface 88 that secures tube 80 within connector body 40. It should be appreciated that tube 80 may be any traditional tube or tube end form comprising a bead, radially outward extending protrusion or flange, or ramp profile, which extends radially outward and axially on the outer surface of the tube, to secure the tube within the connector body. In an exemplary embodiment, tube 80 comprises a metal. In an exemplary embodiment, tube 80 comprises a nonmetal (e.g., polymer, rubber, ceramic, etc.).

Figure 3A:
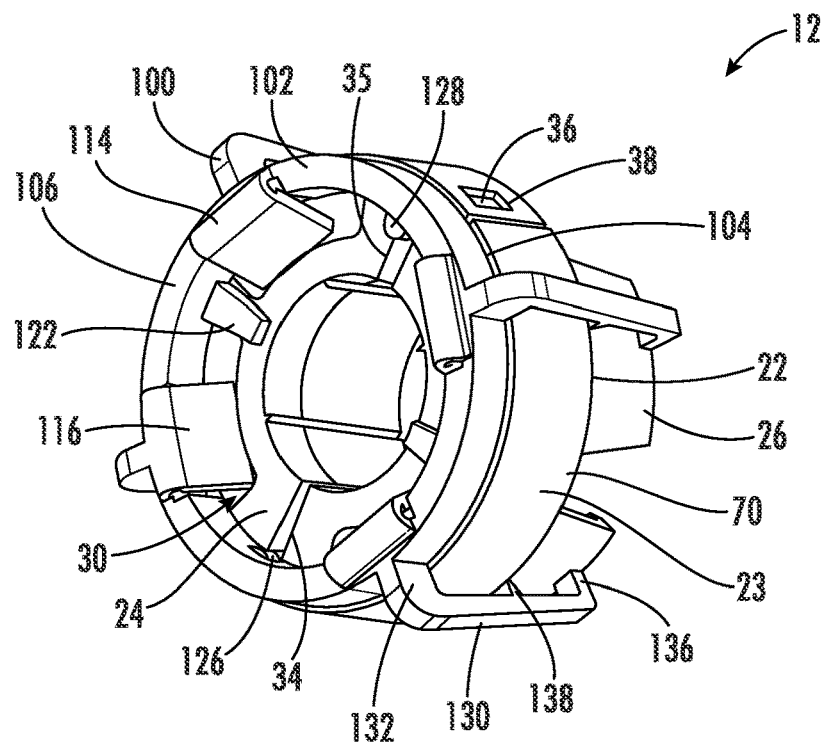
FIG. 3A is a front perspective view of the verification assembly shown in FIG. 1.
Figure 3B:
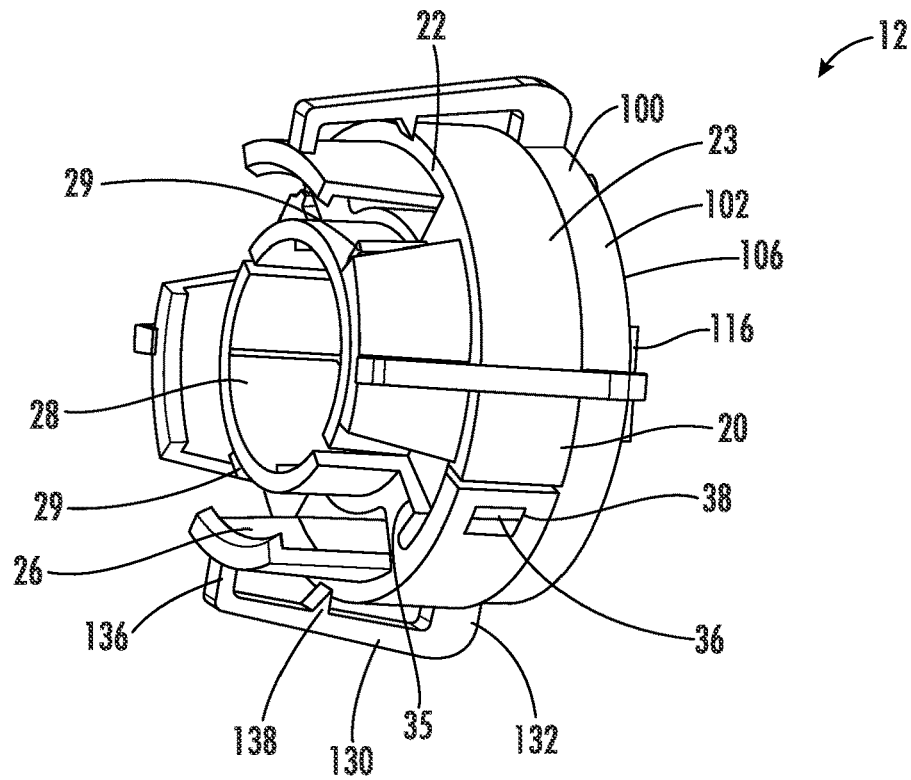
FIG. 3B is a rear perspective view of the verification assembly shown in FIG. 1.
Figure 4A:
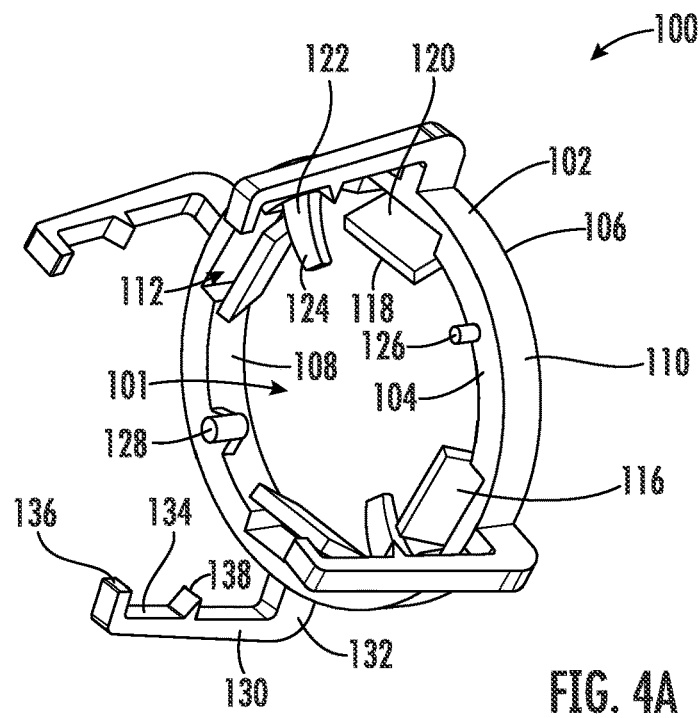
FIG. 4A is a rear perspective view of the verification device shown in FIG. 1.
Figure 4B:
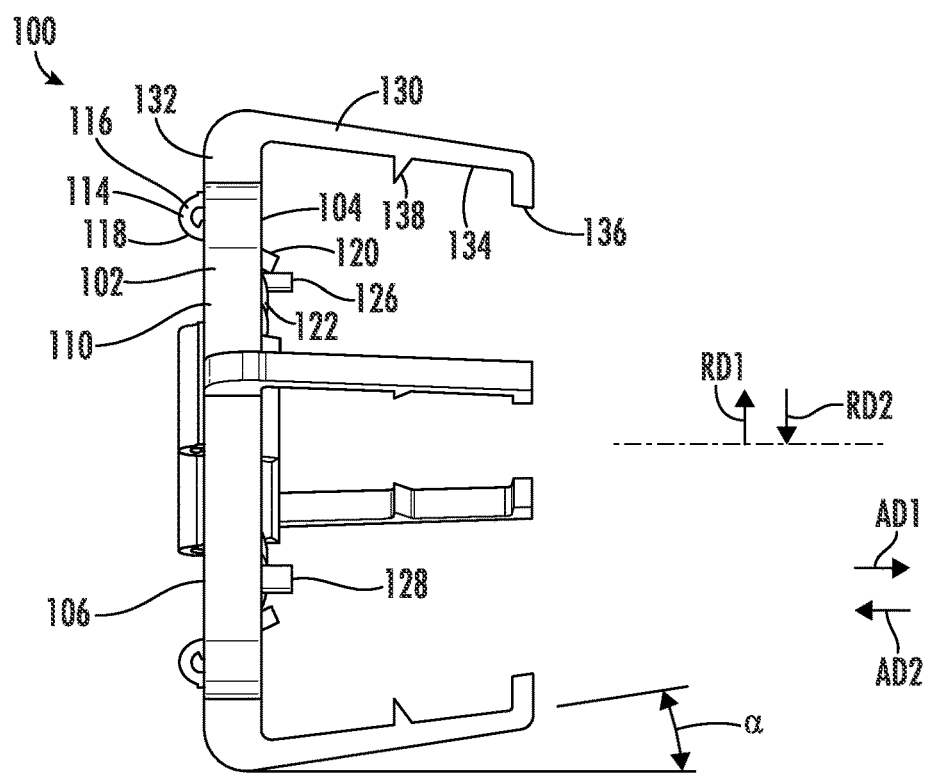
FIG. 4B is a side elevational view of the verification device shown in FIG. 1.

FIG. 3A is a front perspective view of verification assembly 12. FIG. 3B is a rear perspective view of verification assembly 12. FIG. 4A is a rear perspective view of the verification device 100. FIG. 4B is a side elevational view of verification device 12. FIG. 5 is a cross-sectional view of fluid connection assembly 10 taken generally along line 5-5 in FIG. 1.

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a turbocharger, refrigeration compressor, or a transmission via radially outward facing surface 60, which may comprise external threading. Connector body 40 may be screwed into a threaded hole in the component via head 58 (e.g., using a wrench), which is then filled with oil, refrigerant, transmission fluid, coolant, etc. In an exemplary embodiment, head 58 is hexagonal; however, it should be appreciated that head 58 may comprise any geometry suitable for applying torque to connector body 40. Another component in which fluid connector 10, specifically connector body 40, may be installed into is a condenser, evaporator, or pump. It should be appreciated that fluid connection assembly 10 may be used in various other components, assemblies, and subassemblies in which fluid connection is desired. Radially outward facing surface 60 may further comprise groove 56. A seal or O-ring may be arranged in groove 56 to create a fluid tight seal between connector body 40 and the component it is connected to.

Seal 62 is arranged in connector body 40. Specifically, seal 62 is arranged in groove 50. Groove 50 is arranged in radially inward facing surface 48. In an exemplary embodiment, seal 62 is an O-ring. In an exemplary embodiment, radially inward facing surface 46 is a cylindrical surface that extends from end 44 to surface 47. Radially inward facing surface 46 is connected to radially inward facing surface 48 via surface 47. In an exemplary embodiment, surface 47 is a frusto-conical surface that connects generally cylindrical radially inward facing surface 46 with generally cylindrical radially inward facing surface 48. In an exemplary embodiment, surface 47 is an axial surface facing in axial direction AD2. In an exemplary embodiment, radially inward facing surface 48 is a cylindrical surface that extends from end 42 to surface 47.

Groove 54 is arranged in radially outward facing surface 52 and comprises axial surface 54A, radially outward facing surface 54B, and axial surface 54C. The diameter of radially outward facing surface 54B is less than the diameter of radially outward facing surface 52. Surface 54A extends radially outward from radially outward facing surface 54B and faces in axial direction AD1. Surface 54C extends radially outward from radially outward facing surface 54B and faces in axial direction AD2. In an exemplary embodiment, surfaces 54A and 54C are parallel. Groove 54 is arranged axially between and spaced apart from end 44 and head 58. In an exemplary embodiment, groove 54 is arranged immediately adjacent to head 58. Groove 54 further comprises apertures 55A-C arranged circumferentially thereabout. Apertures 55A-C extend from radially outward facing surface 54B to through-bore 41. Groove 54 is operatively arranged to engage retaining clip 70 and secondary retainer 20, as will be described in greater detail below. In an exemplary embodiment, connector body 40 comprises a metal. In an exemplary embodiment, connector body 40 comprises a nonmetal (e.g., polymer, ceramic, rubber).

Retaining clip or retaining ring or snap clip/ring 70 is arranged in groove 54 in body 40. Retaining clip 70 is generally ring-shaped including one or more protrusions extending radially inward. In the embodiment shown, retaining clip 70 comprises protrusions 72A-C. Protrusions 72A-C extend radially inward through apertures 55A-C in groove 54. Protrusions 72A-C are arranged to engage shoulder 87, specifically, surface 88, to secure tube 80 within connector body 40. Retaining clip 70 may comprise any material that is capable of elastically deforming and returning to its original shape (e.g., metal, polymer, etc.).

To assemble fluid connection assembly 10, retaining clip 70 is arranged on connector body 40 such that it is engaged with groove 54 and protrusions 72A-C are engaged with apertures 55A-C and protrude into through-bore 41. Tube 80 is then inserted in axial direction AD1, with end 82 first, into connector body 40. Radially outward facing surface 84 engages seal 62 and section 83 is arranged inside of connector body 40 proximate radially inward facing surface 48. As shoulder 87 engages protrusions 72A-C, retaining clip 70 expands radially outward in radial direction RD1. Once shoulder 87 clears protrusions 72A-C(i.e., is arranged axially between protrusions 72A-C and surface 47), protrusions 72A-C snap back radially inward in radial direction RD2 to form the connected state. In the connected state, shoulder 87 engages or is arranged proximate surface 47 and/or surface 46. Surface 47 prevents shoulder 87 and thus tube 80 from displacing in axial direction AD1, and protrusions 72A-C prevent shoulder 87 and thus tube 80 from displacing in axial direction AD2 with respect to connector body 40. As such, the engagement of retainer 70 with connector body 40 and tube 80 prevents displacement of tube 80 in axial directions AD1 and AD2, as well as radial directions RD1 and RD2, relative to connector body 40.

Secondary retainer 20 comprises surface 22, surface 24, radially outward facing surface 23 extending between surface 22 and surface 24, one or more latching fingers 26, one or more apertures or cavities 30, and one or more engaging fingers 28. Surface 22 is an axial surface facing at least partially in axial direction AD1. Surface 24 is an axial surface facing at least partially in axial direction AD2. In an exemplary embodiment, surface 24 is parallel to surface 22. In an exemplary embodiment, surface 24 is nonparallel to surface 22. Secondary retainer 20 comprises through-bore 21 extending therethrough, for example from surface 24 to surface 22. Through-bore 21 forms a radially inward facing surface operatively arranged to engage tube 80, specifically radially outward facing surface 92.

Fingers 26 are connected to and extend axially from surface 22. Each finger 26 comprises a radially outward facing surface and flange 27. The radially outward facing surface of finger 26 is arranged radially inward from radially outward facing surface 23 thereby creating a recess in secondary retainer 20. Protrusion 138 of verification device 100 engages this recess, as will be described in greater detail below. Flange 27 is arranged at the distal end of finger 26 and extends radially inward in radial direction RD2. Flange 27 is operatively arranged to engage groove 54, and specifically surface 54A and/or 54B, to connect secondary retainer 20 to connector body 40. In an exemplary embodiment, finger 26 extends radially inward in axial direction AD1, and is arranged at angle β with respect to radially outward facing surface 23. In an exemplary embodiment, angle β is an acute angle (e.g., 2-15 degrees).

Fingers 28 are connected to and extend axially from surface 22. In an exemplary embodiment, fingers 28 are aligned with through-bore 21. Fingers 28 are operatively arranged to engage tube 80, specifically surface 88 and/or surface 90. When secondary retainer 20 is connected to connector body 40 via engagement of fingers 26 and groove 54, fingers 26 engage surface 88 and/or surface 90 within through-bore 41 of connector body 40 to prevent tube 80 from being removed from connector body 40. Since retaining clip 70 is the primary element arranged to prevent tube 80 from being removed from connector body 40, retainer 20 is referred to as a secondary retainer. The length of fingers 28 prevent secondary retainer 20 from being secured to connector body 40 unless tube 80 is fully inserted therein (i.e., shoulder 87 is arranged on the right side of retaining clip 70). Thus, if secondary retainer 20 can be fully assembled on fluid connection assembly 10, secondary retainer 20 acts as a secondary retaining device in case of failure of retaining clip 70 and also assures that tube 80 is fully connected to connector body 40. As such, secondary retainer 20 can be referred to as an assurance cap.

In an exemplary embodiment, secondary retainer 20 may further comprise one or more protrusions 29 connected to and extending from surface 22. Protrusions 29 are operatively arranged to engage end 44 and prevent secondary retainer 20 from axially displacing relative to connector body 40. For example, when secondary retainer 20 is connected to connector body 40, protrusion 29 is engaged with end 44 and flange 27 is engaged with surface 54A, thereby preventing or limiting secondary retainer 20 from displacing in axial directions AD1 and AD2 with respect to connector body 40. In an exemplary embodiment, protrusions 29 are connected to and extend radially outward from fingers 28.

Apertures 30 extend from surface 24 and are operatively arranged to engage indicator tabs 116, as will be described in greater detail below. In an exemplary embodiment, apertures 30 extend partially from surface 24 to surface 22. In an exemplary embodiment, apertures 30 extend from surface 24 to surface 22. Apertures 30 are arranged radially between and spaced apart from radially outward facing surface 23 and through-bore 21.

In an exemplary embodiment, secondary retainer 20 comprises two sections hingedly connected via hinge 32. In an exemplary embodiment, hinge 32 is a living hinge. The two sections are capable of being fixedly secured, for example, via engagement of male connector 36 with female connector 38. As shown, male connector 36 is arranged on a first section of secondary retainer 20 to engage female connector 38 on a second section of secondary retainer such that the two sections are fixedly secured. In an exemplary embodiment, male connector 36 is hook-shaped (in a radially outward direction) and includes a groove and a projection. The groove is arranged in radially outward facing surface 23. The projection extends generally radially outward in radial direction RD1 from the groove. In an exemplary embodiment, the projection comprises a tapered section near its top end operatively arranged to allow engagement of the projection with female connector 38, specifically, the aperture of female connector 38, to occur with greater ease. The projection may further comprise a channel. The channel may comprise a bottom portion, and two tapered side wall portions extending from the bottom portion. The channel is arranged to engage the projection of female connector 38 in order to properly align the projection of male connector 36 with the aperture of female connector 38.

Female connector 38 comprises an aperture extending radially inward from radially outward facing surface 23. The aperture is operatively arranged to engage the projection of male connector 36 to lock the two sections of secondary retainer 20. Female connector 38 may further comprise a projection including at least two tapered surfaces. The tapered surfaces of the projection are arranged to engage the channel of male connector 36 to accurately align the projection of male connector 36 with the aperture of female connector 38. In an exemplary embodiment, female connector 38 further comprises a radial gap arranged radially between the aperture and projection of female connector 38. The radial gap is operatively arranged to allow radial displacement of female connector 38. For example, as the first section of secondary retainer 20 is displaced toward the second section of secondary retainer 20, female connector 38 engages the projection of male connector 36 and displaces radially outward in radial direction RD1. Once the aperture of female connector 38 is aligned with the projection of male connector 36, female connector 38 snaps back radially inward, in radial direction RD2, thereby securing the first and second sections of secondary retainer 20 together. The radial gap allows for this increased radial flexion of female connector 38.

Verification device 100 generally comprises ring portion 102, at least one indicator tab 116, at least one spring or tensioner 122, and one or more arms 130. Ring portion 102 comprises surface 102, surface 104, through-bore 101 forming radially inward facing surface 108, and radially outward facing surface 110. Surface 102 is an axial surface facing at least partially in axial direction AD1 and surface 104 is an axial surface facing at least partially in axial direction AD2. In an exemplary embodiment, surface 104 is parallel to surface 102. In an exemplary embodiment, surface 104 is nonparallel to surface 102.

Figure 6:
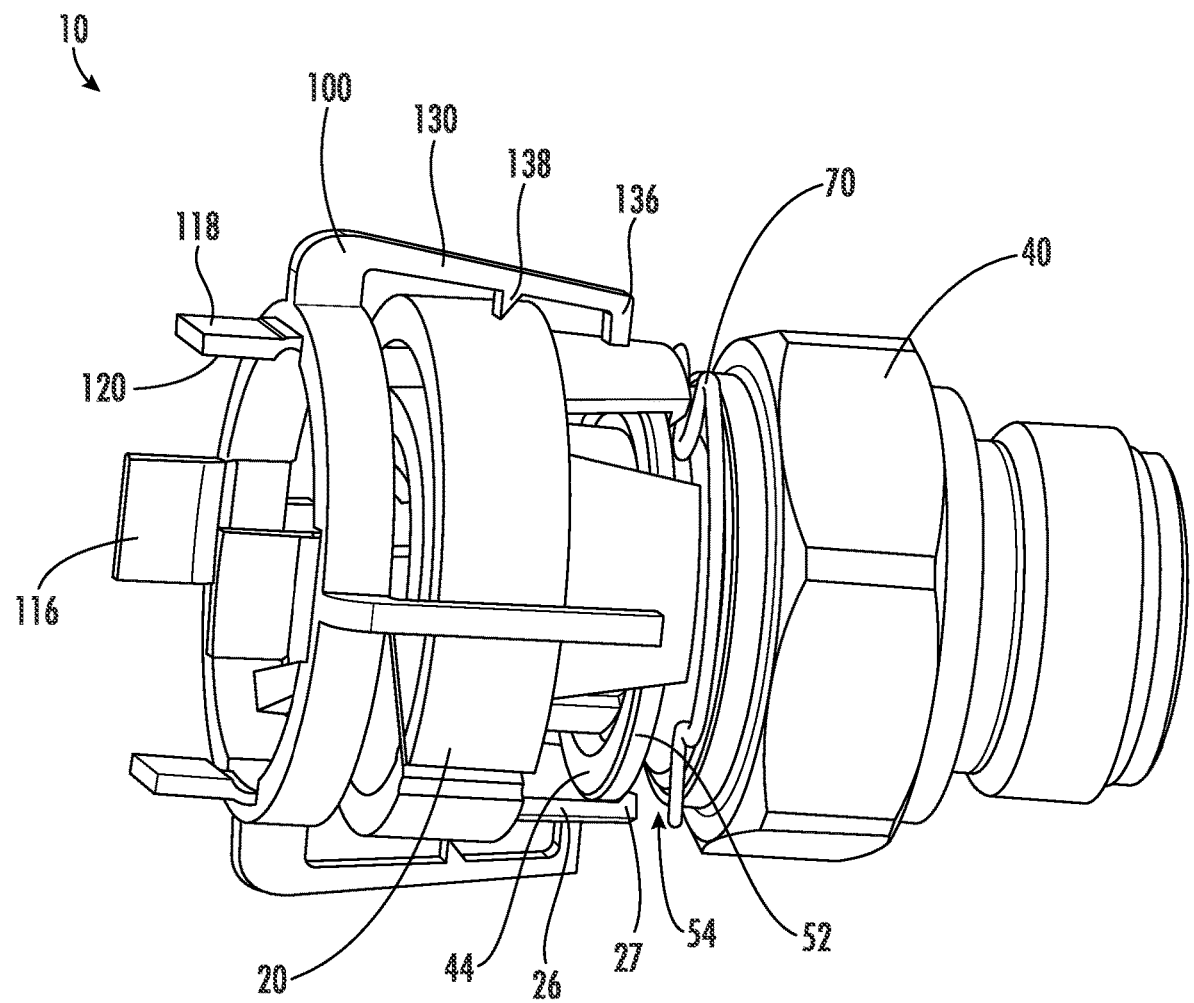
FIG. 6 is a front perspective view of the fluid connection assembly shown in FIG. 1, in a triggered state.
Figure 7A:
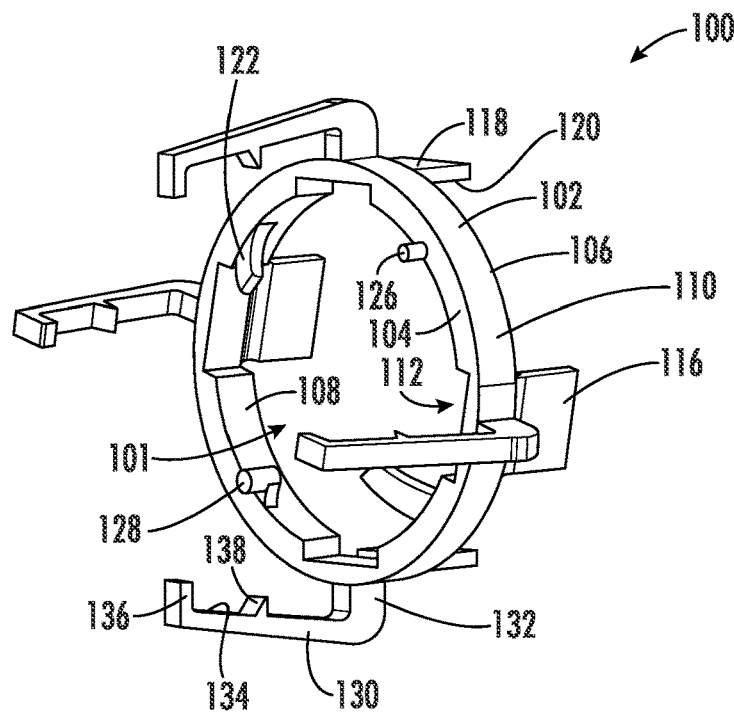
FIG. 7A is a rear perspective view of the verification device shown in FIG. 6.
Figure 7B:
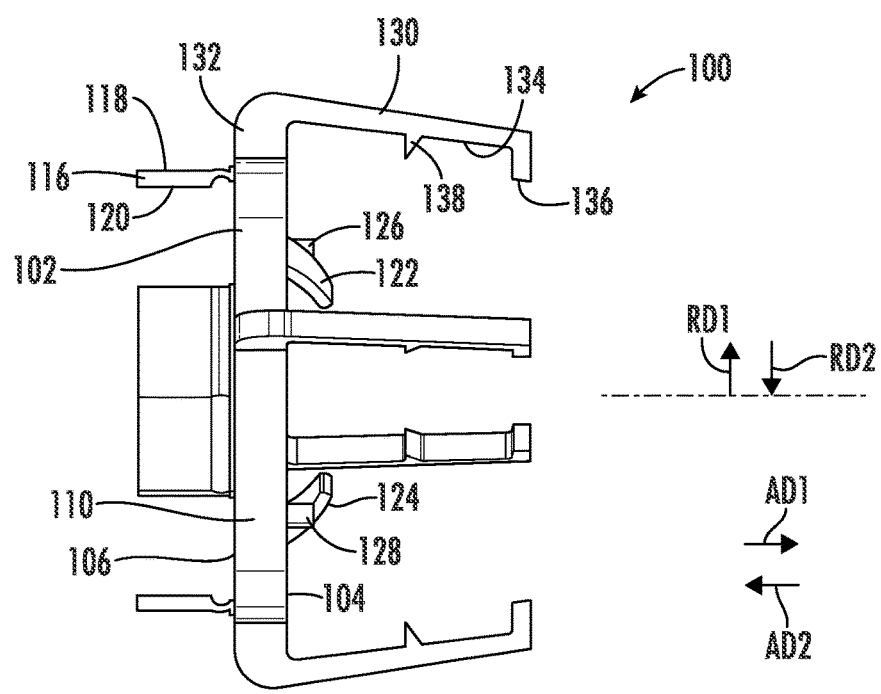
FIG. 7B is a side elevational view of the verification device shown in FIG. 6.

Indicator tab 116 is pivotably connected to ring portion 102. In an exemplary embodiment, and as shown, indicator tab 116 is connected to and extends from surface 106. FIGS. 1-5 show indicator tab 116 in a non-triggered state. In the non-triggered state, indicator tab 116 is folded radially inward such that indicator tab is tucked within ring portion 102. As best shown in FIG. 5, indicator tab 116 is maintained in the non-triggered state via engagement with aperture 30. Indicator tab 116 is biased to the triggered state, as shown in FIGS. 6-7B, by hinge or living hinge or spring device 114. Indicator tab 116 comprises surface 118 and surface 120. In an exemplary embodiment, surface 118 comprises an indication element, for example, a machine readable code (e.g., a barcode or QR code), a visual indicator such as a color or shape or symbol, a RFID chip, or the like. Thus, when indicator tab 116 is triggered, the indication element can be read by the un-aided human eye, code scanner, and/or RFID reader. In an exemplary embodiment, ring portion 102 may further comprise at least one channel 112. Channel 112 extends radially outward from radially inward facing surface. In the non-triggered state, indicator tab 116 may at least partially engage the at least one channel. The operation of indicator tab 116 will be described in greater detail below.

Spring 122 is connected to ring portion 102 and is operatively arranged to engage end 24 of secondary retainer 20 to bias verification device 100 in axial direction AD2 with respect to secondary retainer 20. In an exemplary embodiment, spring 122 extends radially inward from radially inward facing surface 108. In an exemplary embodiment, spring 122 comprises curvilinear surface 124 that extends in axial direction AD1 with respect to surface 104. In an exemplary embodiment, curvilinear surface is convex in axial direction AD1, or in the axial direction facing surface 24 of secondary retainer 20.

In an exemplary embodiment, verification device 100 further comprises at least one alignment pin, for example, alignment pin 126 and/or alignment pin 128. Alignment pins 126 and 128 are operatively arranged to engage spaces in secondary retainer to align indicator tabs 116 with apertures 30. For example, alignment pin 128 engages space 35 created between male connector 36 and female connector 38, and alignment pin 126 engages space 34 created by living hinge 32. Alignment pin 126 is connected to and extends in axial direction AD1 from surface 104. In an exemplary embodiment, alignment pin 126 extends radially inward from radially inward facing surface 108. Alignment pin 128 is connected to and extends in axial direction AD1 from surface 104. In an exemplary embodiment, alignment pin 128 extends radially inward from radially inward facing surface 108.

Arms 130 are connected to and extend from ring portion 102. Each arm 130 generally extends in axial direction AD1 from ring portion 102 to engage secondary retainer 20. In an exemplary embodiment, each arm 130 comprises radially inward facing surface 134, flange 136 extending radially inward from radially inward facing surface 134, and projection 138 extending radially inward from radially inward facing surface 134. Flange 136 is arranged at the distal end of arm 130 and is operatively arranged to engage finger 26, specifically the radially outward facing surface of finger 26. Projection 138 is arranged between and spaced apart from flange 136 and the proximal end of arm 130. Projection 138 is operatively arranged to engage surface 22 in the non-triggered state of verification device 100, as best shown in FIG. 5. In an exemplary embodiment, arm 130 may further comprise portion 132. Portion 132 is connected to and extends radially outward from radially outward facing surface 110. In an exemplary embodiment, arm 130 and/or radially inward facing surface 134 is arranged at angle α with respect to radially outward facing surface 110. Angle α is an acute angle, for example, 5-20 degrees.

To assembly verification assembly 12, indicator tabs 116 are tucked radially inward and verification device 100 is slid axially onto secondary retainer 20 in axial direction AD1 until indicator tabs 116 are engaged with a respective apertures 30, flanges 136 are engaged with fingers 26, projections 138 are engaged with surface 22, and springs 122 are engaged with surface 24. Arms 130 may be displaced radially outward during assembly so as to clear radially outward facing surface 23. In this assembled state of verification assembly 12, as shown in FIGS. 1-5, the engagement of springs 122 with surface 24 biases verification device 100 in axial direction AD2 with respect to secondary retainer 20. However, engagement of projections 138 with surface 22 prevents verification device 100 from displacing in axial direction AD2 with respect to secondary retainer.

FIG. 6 is a front perspective view of fluid connection assembly 10, in a triggered state, wherein tube 80 is hidden to better show verification assembly 12. FIG. 7A is a rear perspective view of verification 100 with indicator tabs 116 in the triggered position or state. FIG. 7B is a side elevational view of verification device 116 with indicator tabs 116 in the triggered position or state.

As verification assembly 12 is displaced in axial direction AD1 along tube 80 toward connector body 40. As flanges 27 engage connector body, and specifically end 44, fingers 26 are displaced radially outward in radial direction RD1. The displacement of fingers 26 radially outward results in arms 130 being displaced radially outward due to their engagement with fingers 26 (i.e., via flanges 136). Such radially outward displacement of arms 130 causes projections 138 to disengage from surface 22, at which point springs 122 force verification device 100 in axial direction AD2 with respect to secondary retainer 20 and allow indicator tabs 116 to disengage from apertures 30 to form the triggered state. In the triggered state, indicator tabs 116 are released from apertures 30 and extend in axial direction AD2 from surface 106, thereby exposing surface 118 radially outward to be seen or read, as previously described. It should be appreciated that, since secondary retainer can only be installed on fluid connection assembly 100 when tube 80 is fully connected to connector body 40, as previously described, verification assembly 12 cannot be triggered unless tube 80 is fully connected to connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connection assembly
12 Verification assembly
20 Secondary retainer
21 Through-bore
22 Surface
23 Radially outward facing surface
24 Surface
26 Fingers
27 Flange
28 Fingers
29 Protrusions
30 Apertures
32 Hinge
34 Space
35 Space
36 Male connector
38 Female connector
40 Connector body
41 Through-bore
42 End
44 End
46 Radially inward facing surface
47 Radially inward facing surface
48 Radially inward facing surface
50 Groove
52 Radially outward facing surface
54 Groove
54A Surface
54B Surface
54C Surface
55A Aperture
55B Aperture
55C Aperture
56 Groove
58 Head
60 Radially outward facing surface
62 Seal
70 Retaining clip
72A Protrusion
72B Protrusion
72C Protrusion
80 Tube
82 End
83 Section
84 Radially outward facing surface
86 Radially outward facing surface
87 Shoulder
88 Surface
89 Section
90 Radially outward facing surface
92 Radially outward facing surface
94 End
96 Through-bore
100 Verification device
101 Through-bore
102 Ring portion
104 Surface
106 Surface
108 Radially inward facing surface
110 Radially outward facing surface
112 Channels
114 Hinge portion
116 Indicator tabs
118 Surface
120 Surface
122 Springs or tensioners
124 Surface
126 Alignment protrusion
128 Alignment protrusion
130 Arms
132 Portion
134 Radially inward facing surface
136 Flange
138 Projection
AD1 Axial direction
AD2 Axial direction
RD1 Radial direction
RD2 Radial direction
α Angle
β Angle

What is claimed is:

1. A verification assembly for a fluid connection assembly, comprising:
   a retainer, including:
      a first surface;
      a second surface; and
      at least one latch finger connected to and extending from the first surface; and
   a verification device, including:
      a ring portion;
      at least one arm connected to and extending from the ring portion; and
      at least one indicator tab pivotably connected to the ring portion;
   wherein:
      in a non-triggered state, the at least one indicator tab is engaged with the retainer; and
      in a triggered state, the at least one indicator tab is not engaged with the retainer.

2. The verification assembly as recited in claim 1, wherein the verification device further comprises at least one tensioner operatively arranged to bias the verification device with respect to the retainer.

3. The verification assembly as recited in claim 1, wherein the at least one arm comprises:
   a distal end comprising a flange;
   a proximal end connected to the ring portion; and
   a projection arranged between the distal end and the proximal end.

4. The verification assembly as recited in claim 3, wherein in the non-triggered state, the projection is engaged with the first surface.

5. The verification assembly as recited in claim 3, wherein the flange is engaged with the at least one latch finger.

6. The verification assembly as recited in claim 1, wherein in the non-triggered state, the at least one indicator tab is engaged with an aperture arranged in the retainer.

7. The verification assembly as recited in claim 1, wherein the at least one indicator is biased toward the triggered position.

8. The verification assembly as recited in claim 1, wherein the verification device comprises at least one alignment pin operatively arranged to engage the retainer.

9. The verification assembly as recited in claim 1, wherein the at least one latch finger is operatively arranged to connect the verification assembly to the fluid connection assembly.

10. The verification assembly as recited in claim 1, wherein the indicator tab comprises a machine readable code.

11. The verification assembly as recited in claim 1, wherein the indicator tab comprises a radio-frequency identification tag.

12. A verification assembly for a fluid connection assembly, comprising:
a verification device, including:
a ring portion;
at least one arm connected to and extending from the ring portion;
at least one indicator tab pivotably connected to the ring portion, the indicator tab biased toward a triggered position; and
a tensioner connected to the ring portion.

13. The verification assembly as recited in claim 12, wherein the at least one arm extends from the ring portion in a first axial direction, and in the triggered position the indicator tab extends from the ring portion in a second axial direction, opposite the first axial direction.

14. The verification assembly as recited in claim 12, wherein the at least one arm comprises:
a distal end comprising a flange;
a proximal end connected to the ring portion; and
a projection arranged between the distal end and the proximal end.

15. The verification assembly as recited in claim 12, further comprising at least one alignment pin extending in an axial direction from the ring portion.

16. The verification assembly as recited in claim 12, wherein the indicator tab comprises at least one of a machine readable code and a radio-frequency identification tag.

17. The verification assembly as recited in claim 12, further comprising a retainer including:
a first surface;
a second surface; and
at least one latch finger extending from the first surface, the at least one arm operatively arranged to engage the at least one latch finger.

18. The verification assembly as recited in claim 17, wherein the at least one indicator tab is:
engaged with the retainer in a non-triggered position; and
not engaged with the retainer is the triggered position.

19. The verification assembly as recited in claim 17, wherein the tensioner is engaged with the second surface, the tensioner biasing the verification device in an axial direction with respect to the retainer.

20. A verification assembly for a fluid connection assembly, comprising:
a verification device, including:
a ring portion;
at least one arm connected to and extending from the ring portion, comprising:
a distal end including a flange;
a proximal end connected to the ring portion; and
a projection arranged between the distal end and the proximal end; and
at least one indicator tab pivotably connected to the ring portion.

* * * * *